(12) United States Patent
Aoki et al.

(10) Patent No.: US 6,571,647 B1
(45) Date of Patent: Jun. 3, 2003

(54) SEAT WEIGHT MEASURING APPARATUS

(75) Inventors: Hiroshi Aoki, Tokyo (JP); Shuji Kusaka, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/521,912

(22) Filed: Mar. 9, 2000

(30) Foreign Application Priority Data

Mar. 9, 1999 (JP) ............................................ 11-061340
Mar. 9, 1999 (JP) ............................................ 11-061341

(51) Int. Cl.[7] ..................... G01L 5/00; B60R 21/32; G01G 19/52
(52) U.S. Cl. .................. 73/862.381; 280/735; 177/144
(58) Field of Search ................. 177/136, 144; 73/862.381; 280/735

(56) References Cited

U.S. PATENT DOCUMENTS

| 5,319,161 A | * | 6/1994 | Miller et al. ................. 177/154 |
| 6,039,344 A | * | 3/2000 | Mehney et al. ............. 280/735 |
| 6,069,325 A | * | 5/2000 | Aoki ........................... 177/136 |
| 6,089,106 A | * | 7/2000 | Patel et al. ............. 73/862.582 |
| 6,109,117 A | * | 8/2000 | Stanley et al. ......... 73/862.325 |
| 6,161,439 A | * | 12/2000 | Stanley ................. 73/862.391 |
| 6,323,444 B1 | * | 11/2001 | Aoki ......................... 177/144 |

FOREIGN PATENT DOCUMENTS

| JP | 11-1153 | 1/1999 |
| JP | 11-304579 | 11/1999 |

* cited by examiner

Primary Examiner—Hezron Williams
Assistant Examiner—Lilybett Martir
(74) Attorney, Agent, or Firm—Foley & Lardner

(57) ABSTRACT

In order to provide a seat weight measuring apparatus in which the performance of load sensors is not spoiled due to dimensional error or deformation of a vehicle body or a seat and provides higher precision measurement, a seat weight measuring apparatus is provided for measuring a seat weight including the weight of a passenger sitting thereon and comprises load sensors for converting at least parts of the seat weight into electric signals and a dislocation/deflection absorbing mechanism (pin brackets and pins) arranged between a seat and the load sensors. Each load sensor comprises a cantilever-type sensor plate which is deformable when subjected to load, and a plurality of strain gauges attached to one surface (strain measuring surface) of the sensor plate. The load sensor is so structured that one of the strain gauges is subjected to tensile strain while the other one of the strain gauges is subjected to the compressive strain when the sensor plate is subjected to the applied load and is thus deformed.

20 Claims, 12 Drawing Sheets

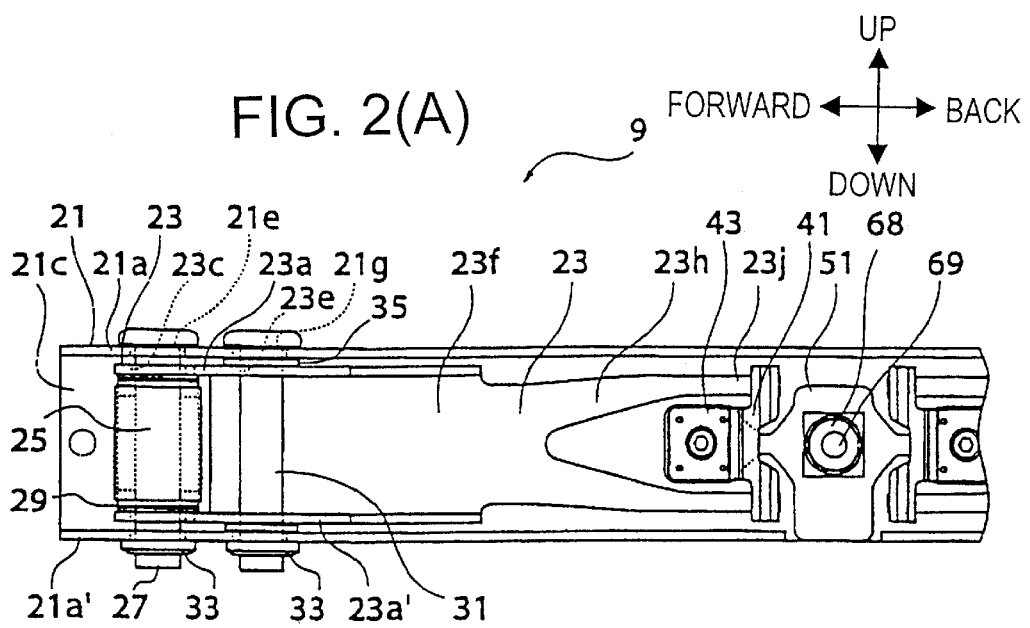
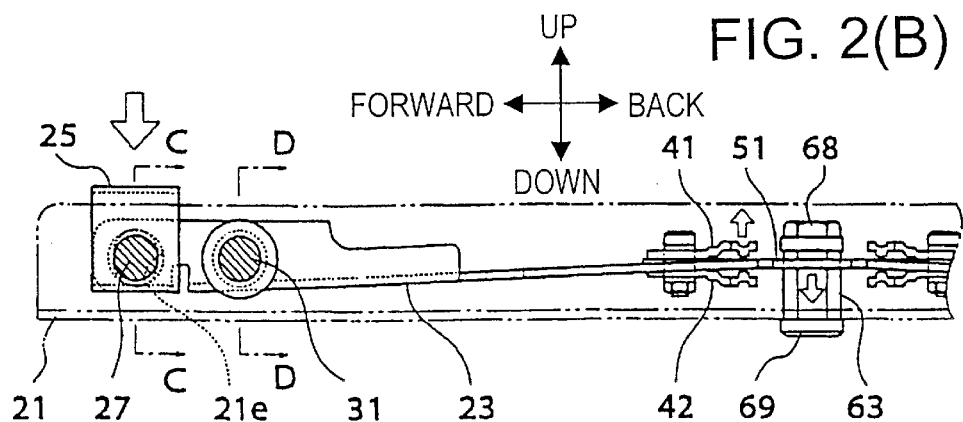
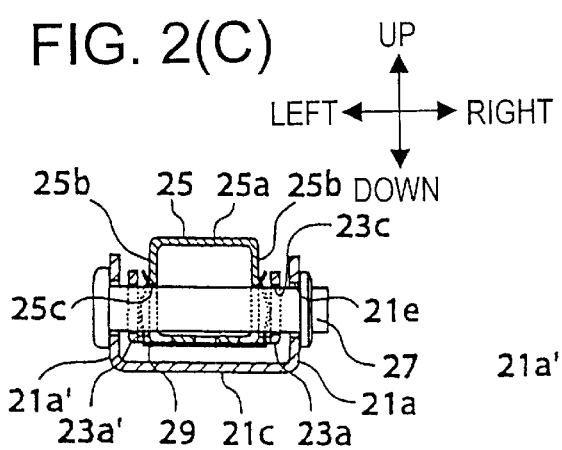
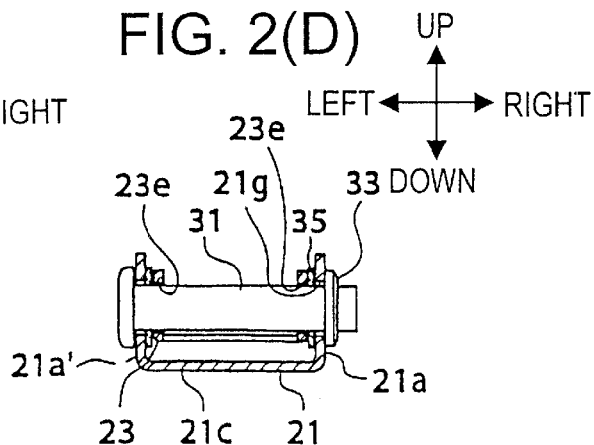

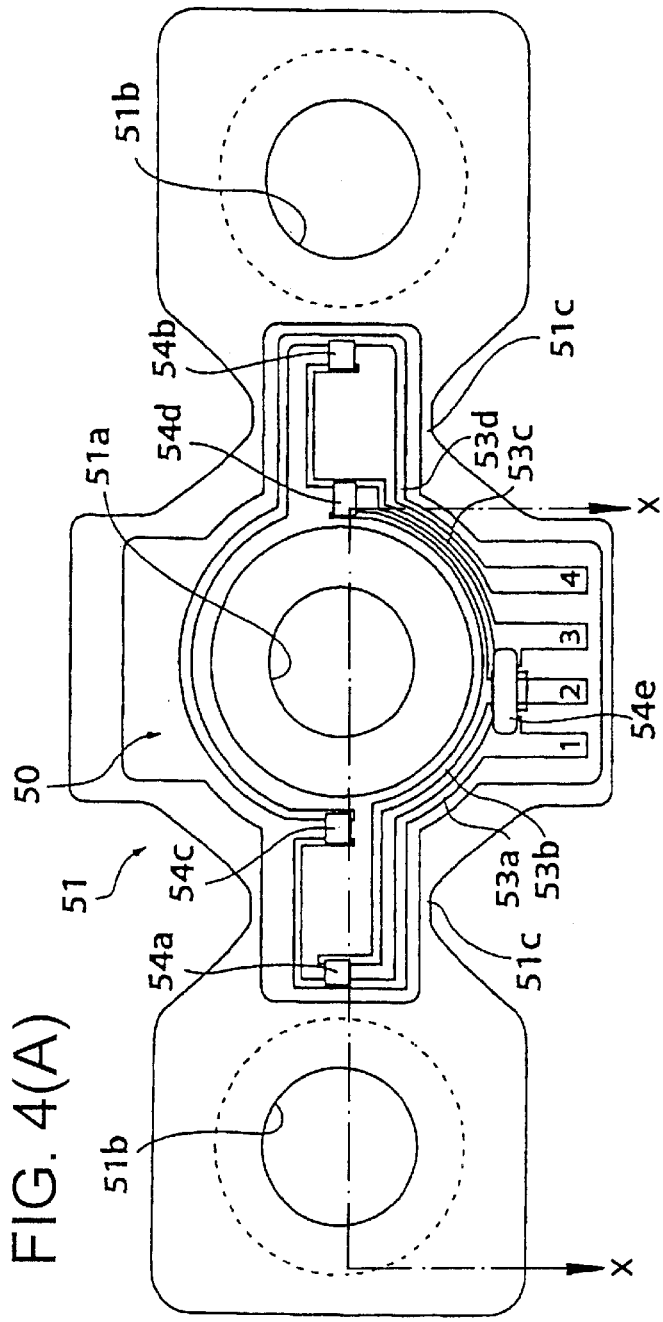
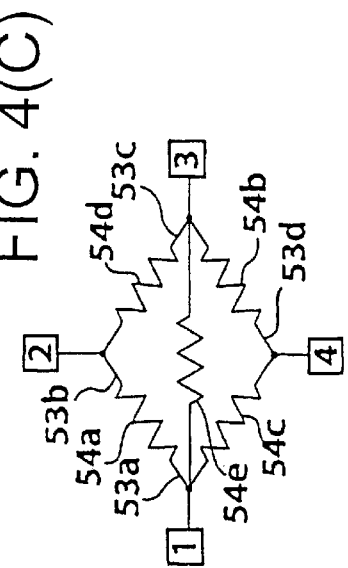
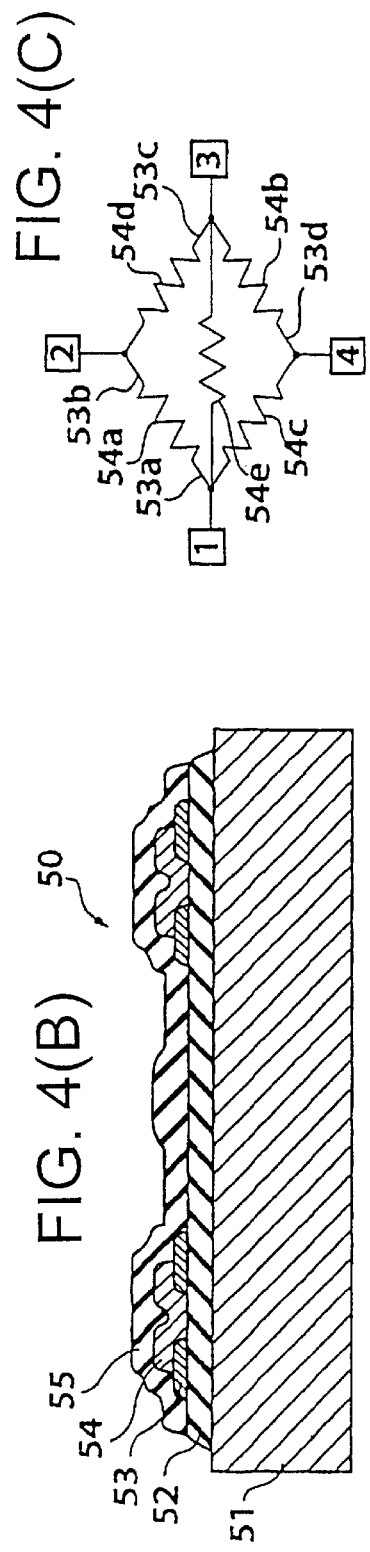
FIG. 4(A)
FIG. 4(B)
FIG. 4(C)

STRAIN DISTRIBUTION

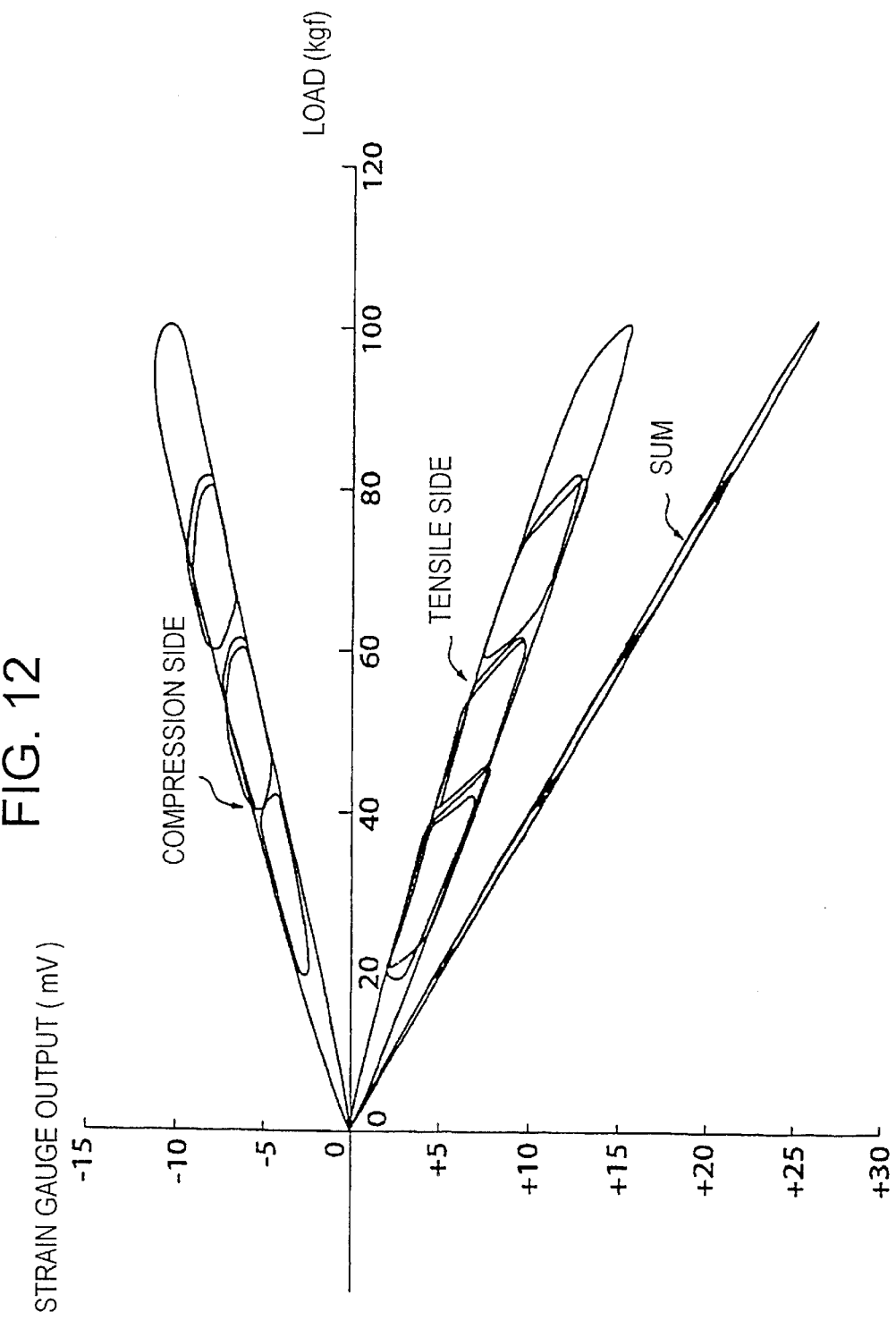

SEAT WEIGHT MEASURING APPARATUS

FIELD OF THE INVENTION

The present invention relates to a seat weight measuring apparatus for measuring a load applied on a vehicle seat such as the weight of a passenger sitting thereon. Particularly, it relates to a seat weight measuring apparatus which has been improved not to spoil the performance of load sensors due to dimensional error or deformation of a vehicle body or a seat and also improved to provide higher precision measurement.

BACKGROUND OF THE INVENTION

Automobiles are equipped with seat belts and airbags to secure safety for passengers in the automobiles. In recent years, there is a trend for controlling the operation of such safety devices according to the weight (body weight) of a passenger for improved performance of seat belts and airbags. For example, the amount of gas to be introduced into the airbag, an airbag inflating speed, or a pre-tension of the seat belt may be adjusted according to the weight of a passenger. For that purpose, some means are needed for measuring the weight of the passenger sitting on the seat. An example of such means includes a proposal of an apparatus for measuring the weight of a passenger by the following steps of arranging load sensors (load cells) at four corners of the bottom of a seat, obtaining loads on the respective corners, and summing them to determine the seat weight including the weight of the passenger (Japanese Patent Application No. H09-156666, Japanese Patent Application No. H10-121627 filed by the applicant of this invention).

To make an accurate measurement by this seat weight measuring apparatus, it is necessary to eliminate loads besides the weight of the seat and the weight of the passenger (or an object) on the seat. One of loads needed to be eliminated is a load to be applied when the seat weight measuring apparatus is forced to be assembled despite the fact that the vehicle or the seat has dimensional error or deformation (in the specification, this load will be referred as to "assembly load").

To obtain a seat weight measuring apparatus which has good durability and high precision but can be manufactured at low cost, it is necessary to establish a strain detecting mechanism which amplifies small strains. Further, it is necessary to reduce manufacturing errors of parts in the mechanism of the apparatus and measurement errors due to the frictional force.

The present invention is made under the above circumstances and the object of the present invention is to provide a seat weight measuring apparatus which has been improved not to spoil the performance of load sensors due to dimensional error or deformation of a vehicle body or a seat.

A further object of the present invention is to provide a seat weight measuring apparatus which has been improved to attain high precision measurement.

Yet another object of the present invention is to provide a seat weight measuring apparatus which has good durability and high precision but can be manufactured at low cost.

SUMMARY OF THE INVENTION

To solve these problems, the seat weight measuring apparatus of the present invention is a seat weight measuring apparatus for measuring a seat weight including the weight of a passenger sitting thereon, which comprises: load sensors arranged inside a seat or between the seat and a vehicle body for converting at least parts of the seat weight into electric signals; and an absorbing mechanism for absorbing dislocation and/or deflection between the seat and the vehicle body.

The aforementioned absorbing mechanism is arranged on the connecting and holding portions between the load sensors and the seat or between the load sensors and the vehicle body to absorb dimensional errors, not to transmit an assembly load exerted due to manufacturing error of parts and/or dimensional dislocation, and/or deformation caused by the installation to the load sensors. Therefore, only pure load to be measured (seat weight) is applied to the load sensors, thereby enabling secure measurement using the effective ranges of the load sensors enough widely. It can also prevent a load exceeding the measurable range of the load sensors from being exerted.

It should be noted that the intention of the seat weight measuring apparatus as described in this specification is basically to measure the weight of a passenger sitting on a vehicle seat. Accordingly, an apparatus for measuring only the weight of a passenger by canceling the weight of a vehicle seat itself is also contained in the range of the seat weight measuring apparatus disclosed by this specification.

According to the present invention, it is preferable that the absorbing mechanism works even after the seat weight measuring apparatus is installed in the vehicle body and the seat.

Even when an unexpected load is exerted on the seat and the seat thus deforms after the seat weight measuring apparatus is installed in the vehicle body or the vehicle body deforms while the vehicle runs, such deformation can be absorbed by connecting portions not to be transmitted to the load sensors.

In the seat weight measuring apparatus of the present invention, it is preferable that the absorbing mechanism includes a slide mechanism and a pivotal mechanism.

Positional, dimensional, and rotational dislocation can be absorbed.

The seat weight measuring apparatus of the present invention preferably further comprises a centering mechanism for regulating the position of the absorbing mechanism.

The centering mechanism is composed of, for example, a relatively weak spring and causes the slide mechanism or the pivotal mechanism to be positioned as close to the center in the slidable range or the pivotal angle as possible. By the function of the centering mechanism, the movement of the slide mechanism and the pivotal mechanism after the installation of the seat weight measuring apparatus can be secured in the both directions (right and left, up and down, forward and backward).

The seat weight measuring apparatus according to another aspect of the present invention is a seat weight measuring apparatus for measuring a seat weight including the weight of a passenger sitting thereon, comprising load sensors arranged inside a vehicle seat or between the seat and a vehicle body for receiving load (including moment, hereinafter referred as to "applied load") relating to the seat weight and for converting the applied load into electric signals, characterized in that each of the load sensors has a cantilever-type sensor member which is deformable when subjected to the applied load, and a plurality of strain gauges attached to one surface (strain measuring surface) of the sensor member; and that the load sensor is so structured that one of the strain gauges is subjected to tensile strain while other one of the strain gauges is subjected to the compressive strain when the sensor plate is subjected to the applied load and thus deformed.

The strain gauge to be subjected to tensile strain and the strain gauge to be subjected to compressive strain are wired on a bridge circuit in such a manner as to form an opposite phase, thereby increasing the outputs of the strain gauges. This attains highly precise measurement with small strains on the sensor, thereby increasing the life of the sensor.

Because the surfaces on which the strain gauges are attached are on one side of the sensor member (e.g. one side of a plate), printing process should be made only on one side when the strain gauges and wirings are printed by, for example, screen printing. This allows sensors to be manufactured at lower cost.

The seat weight measuring apparatus according to another aspect of the present invention is a seat weight measuring apparatus for measuring a seat weight including the weight of a passenger sitting thereon, comprising load sensors arranged inside a vehicle seat or between the seat and a vehicle body for receiving load relating to the seat weight and for converting the load into electric signals, characterized in that each of said load sensors has a sensor member of which thickness is constant and width is partially different and which is deformable when subjected to the applied load, and a plurality of strain gauges attached to one surface (strain measuring surface) of the sensor member; that the strength in deformation of an elastic deforming portion of the sensor member is adjusted so as to form a region providing substantially constant surface strain on a portion of the strain measuring surface of the sensor member when the sensor member is subjected to the applied load; and that the strain gauges are attached to that region.

Since the strain gauges are attached (printed) on the region providing substantially constant surface strain, the strains may not vary even though the positions of the strain gauges are slightly shifted, thereby preventing measurement error. Therefore, this can ensure high precision of measurement and can reduce the quality requirement on manufacturing.

The seat weight measuring apparatus according to another aspect of the present invention is a seat weight measuring apparatus for measuring a seat weight including the weight of a passenger sitting thereon, comprising load sensors arranged inside a vehicle seat or between the seat and a vehicle body for receiving load relating to the seat weight and converting the load into electric signals, characterized in that each of the load sensors has a sensor member of which thickness is constant and width is partially different and which is deformable when subjected to the applied load, and a plurality of strain gauges attached to one surface (strain measuring surface) of the sensor member; that the sensor member is a cantilever; that one end is a fixed portion, the other end is a subjected portion to be subjected to the applied load, and a portion between the ends is a strain gauge fixing portion; and that both the fixed portion and the subjected portion are patched with reinforcing members to concentrate strain in the strain gauge fixing portion.

Because strains are concentrated in the portion on which the strain gauges are attached, highly precise measurement is performed and measurement error can be prevented even with manufacturing error and/or assembling error of other parts.

According to this aspect, it is preferable that the subjected portion of said sensor member is provided with a half arm, wherein the half arm has a body having relatively high rigidity to be in contact with the subjected portion and wings projecting the body, wherein said wings have action portions to be subjected to simple load (normal load not moment), wherein said half arm has such a structure (reversing structure) that the simple load is transmitted mainly as bending moment to the subjected portion of said sensor member via the body of said half arm, and wherein according to the reversing structure of said half arm, a wave-like strain is applied to the strain measuring surface of said sensor member.

Further, it is preferable that said half arm is provided with a releasing mechanism at the action points thereof, wherein the releasing mechanism releases load besides vertical load by sliding or rotation, and that the strain gauge fixing portion of said sensor member has a compression-side region and a tension-side region which are arranged symmetrically about a neck portion with a reduced width in its plane view.

When load is applied in the longitudinal direction and/or rotational moment is applied, the balance of strain between the tension side and the compression side is changed in such a manner as not to change the total sensitivity of the sensors relative to the vertical load. Even with dislocation in a horizontal direction (e.g. the longitudinal direction of the vehicle) or axial force acting on the sensor plate, error can be cancelled by means of the compression-side strain gauge and the tension-side strain gauge and the total sensitivity obtained by summing the outputs of both the strain gauges may not include such error.

In the seat weight measuring apparatus of the present invention, it is preferable that the action points of said half arm and the center line in the thickness of the sensor member are set to be in substantially the same level or have height difference of ±5 mm or less. That is, when frictional force (axial force) acts on the aforementioned action points, the moment arm for deforming the sensor plate due to the frictional force is short. This means that the deformation of the sensor plate due to the frictional force is little, thereby reducing the measurement error.

BRIEF EXPLANATION OF THE DRAWINGS

FIGS. 1(A), 1(B) are views showing a dislocation/deflection absorbing mechanism for a seat weight measuring apparatus according to a first embodiment, in which FIG. 1(A) is an exploded perspective view thereof and FIG. 1(B) is a front sectional view of a pin bracket.

FIGS. 2(A) through 2(D) are views illustrating the entire construction of a seat weight measuring apparatus according to the first embodiment of the present invention, in which FIG. 2(A) is a plan view thereof, FIG. 2(B) is a side sectional view thereof, and FIGS. 2(C) and 2(D) are front sectional views thereof.

FIG. 4(A) is a plan view showing the detailed structure of the sensor plate, FIG. 4(B) is a side sectional view of the sensor plate taken along the line X—X of FIG. 4(A), and FIG. 4(C) is a circuit diagram of the sensor.

FIGS. 5(A) through 5(C) are views showing the relation between the sensor plate and half arms, in which FIG. 5(A) is a plan view, FIG. 5(B) is a side view illustrating the non-loaded state, FIG. 5(C) is a side view schematically illustrating the loaded state.

FIGS. 8(A) and 8(B) are views for explaining the way of examining the slidable dimension of the absorbing mechanism relative to the width direction of the vehicle body, in which FIG. 8(A) shows a state before a load is applied and FIG. 8(B) shows a state after the load is applied.

FIG. 10(A) is a side view thereof, FIG. 10(B) is a plan view of the sensor plate, and FIG. 10(C) is a graph schematically illustrating strain distribution on the surface of the sensor plate.

FIG. 12 is a graph showing data indicating the influences of the axial force applied to the supports of the half arms on the measurement data according to the first embodiment of the present invention.

DETAILED DESCRIPTION OF THE PREFERRED EMBODIMENTS

Hereinafter, embodiments will be described with reference to the drawings. First, the structure around a vehicle seat will be described with reference to FIGS. 6(A), 6(B).

Figure 6A:
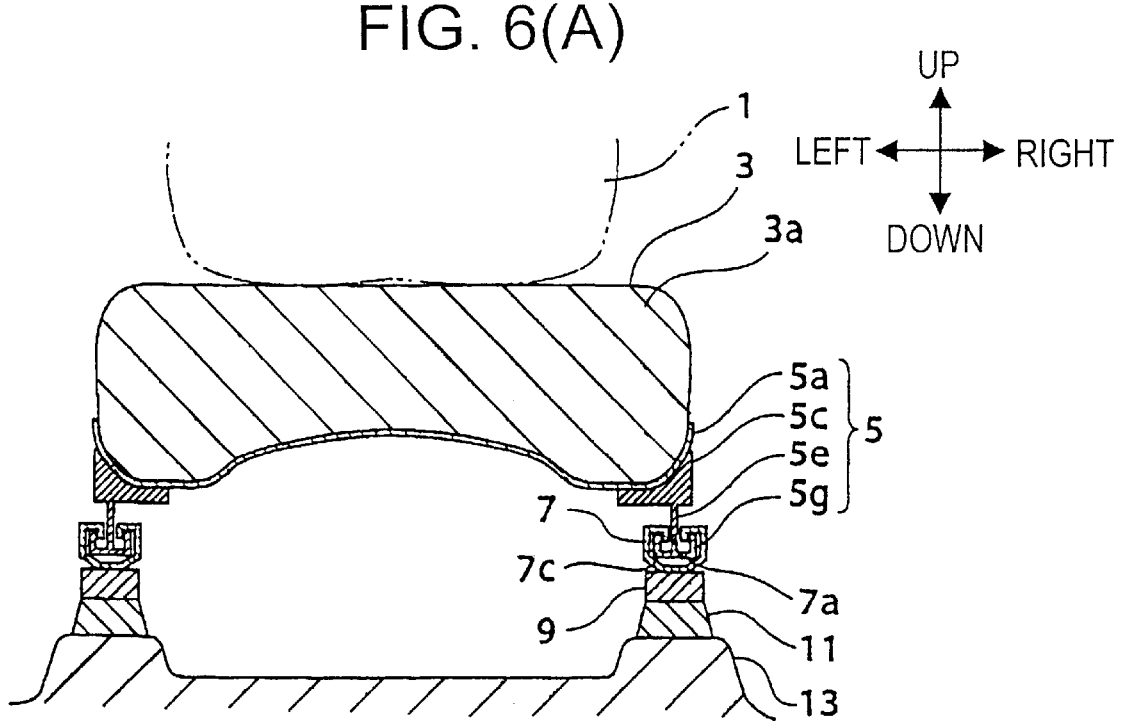
FIG. 6(A) is a front sectional view schematically showing a structural example for fixing a seat to a vehicle body and FIG. 6(B) is a side view thereof.
Figure 6B:
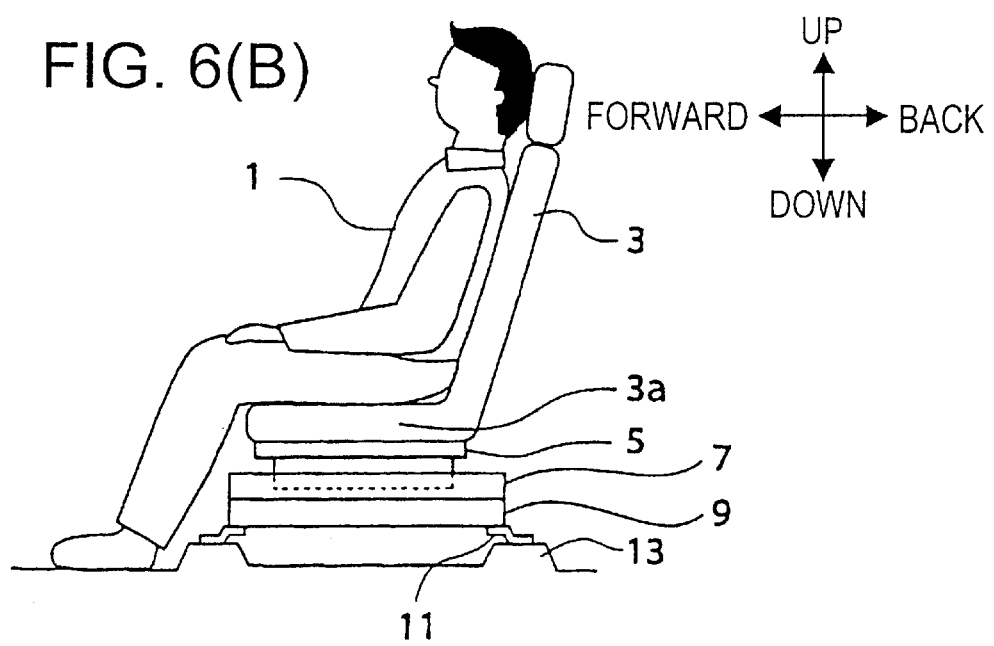

FIG. 6(A) is a front sectional view schematically showing a structural example for fixing a seat to a vehicle body and FIG. 6(B) is a side view thereof. It should be understood that arrows in the drawings indicate as follows. UP: the opposite direction of the gravitational direction when the vehicle is placed horizontally, DOWN: the gravitational direction, FORWARD: the forward direction of the vehicle, BACKWARD: the reverse direction of the vehicle, LEFT: the left side as facing the forward direction of the vehicle, RIGHT: the right side as facing the same.

A seat 3 is shown in FIGS. 6(A), 6(B). A passenger 1 sits on a seat squab 3a of the seat 3. The seat squab 3a is supported at its lower surface by a seat frame 5 made of a steel plate. The seat frame 5 comprises components including a bottom plate 5a, lateral plates 5c, vertical plates 5e, and slide plates 5g. The bottom plate 5a extends to cover the lower surface of the seat squab 3a. The lateral plates 5c extend along the left and right sides of the lower surface of the bottom plate 5a. The vertical plates 5e are hung from the center portions of the lower surfaces of the lateral plates 5c, respectively. The slide plates 5g project right and left of the respective vertical plates 5e like wings and the end portions of each slide plate 5g are bent upward.

Two seat rails 7 are arranged beneath right and left portions of the seat 3 so as to extend in the forward and backward direction (the lengthwise direction) and parallel to each other. The cross section of each seat rail 7 is formed in a U-like shape and has a concavity 7c therein and a groove 7a formed in the upper portion of the concavity 7c. Inserted in the groove 7a is the vertical plate 5e of the seat frame 5.

The slide plate 5g of the seat frame 5 is housed in the concavity 7c of the seat rail 7. The slide plate 5g is slidable in the lengthwise direction in the seat rail 7.

Connected to the lower surface of each seat rail 7 is a seat weight measuring apparatus 9. The seat weight measuring apparatus 9 has an elongated box-like profile extending in the lengthwise direction. The seat weight measuring apparatus 9 will be detailed later.

Attached to front and rear ends of the lower surface of the seat weight measuring apparatus 9 are seat brackets 11. The seat brackets 11 are fixed to seat fixing portions 13 of the vehicle body by means of bolts.

FIGS. 2(A)–2(D) are views illustrating the entire construction of a seat weight measuring apparatus according to a first embodiment of the present invention. FIG. 2(A) is a plan view thereof, FIG. 2(B) is a side sectional view thereof, and FIGS. 2(C) and 2(D) are front sectional views thereof. In FIGS. 2(A) and 2(B), the illustration of the seat weight measuring apparatus on the rear side is omitted.

Figure 3:
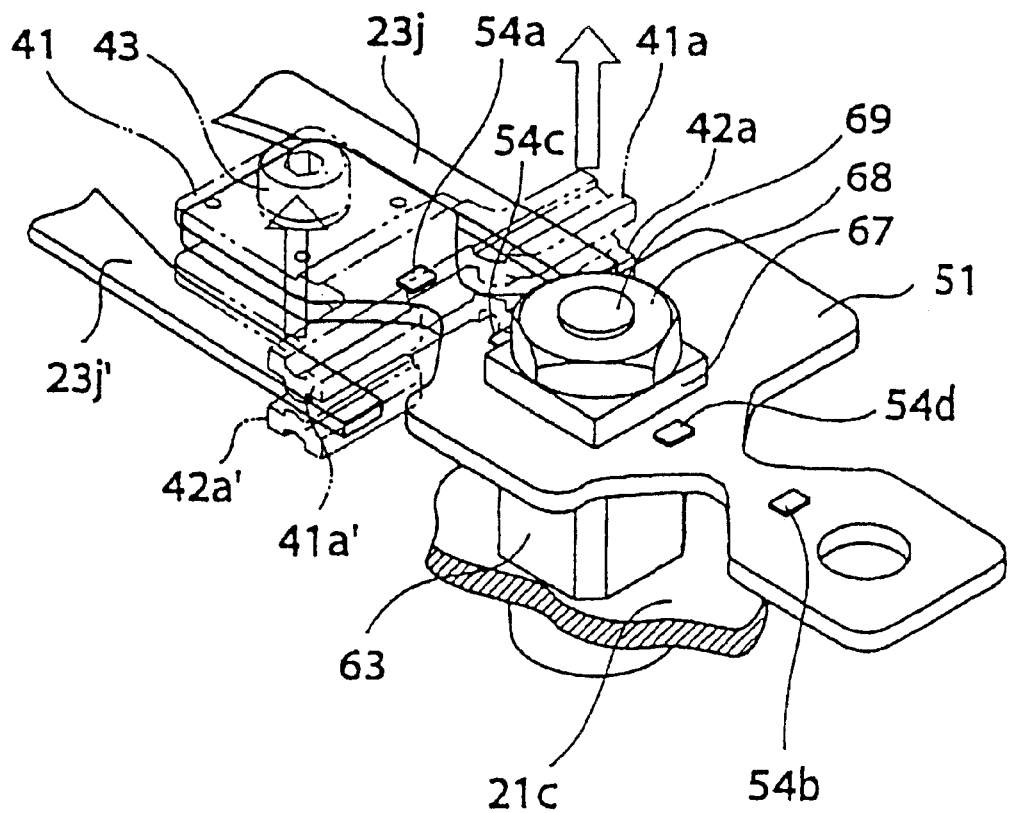
FIG. 3 is a partially broken perspective view showing detailed structure around the sensor plate.

FIG. 3 is a partially broken perspective view showing the details of the construction around a sensor plate.

FIGS. 4(A) through 4(C) show a structural example of the sensor plate of the seat weight measuring apparatus according to the first embodiment of the present invention. FIG. 4(A) is a plan view showing the details of the construction of the sensor plate, FIG. 4(B) is a side sectional view of the sensor plate taken along the line X—X of FIG. 4(A), and FIG. 4(C) is a circuit diagram of the sensor.

Figure 5A:
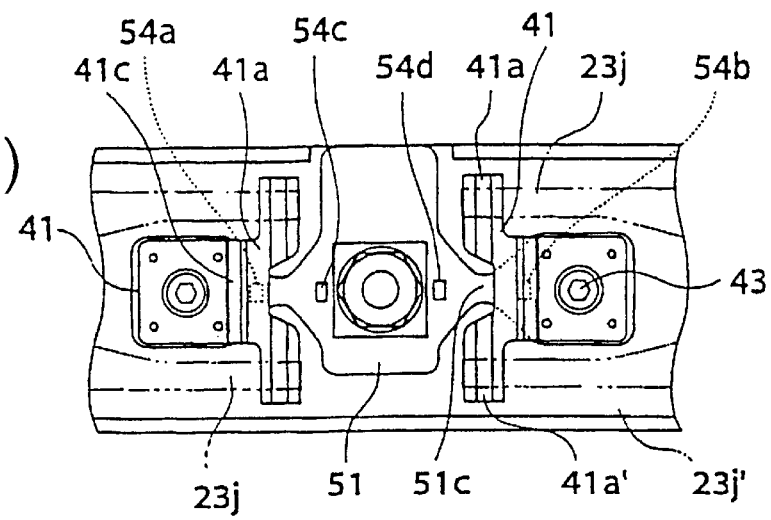
Figure 5B:
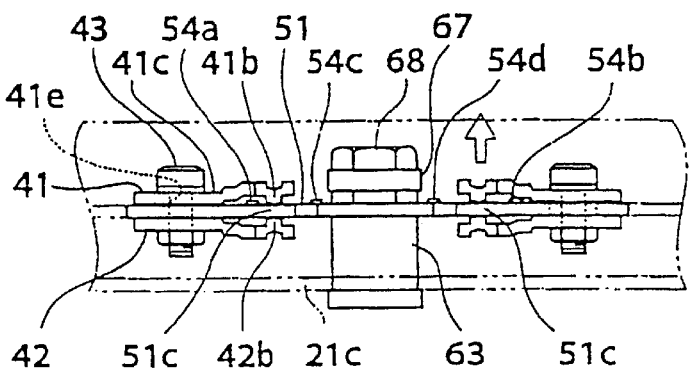
Figure 5C:
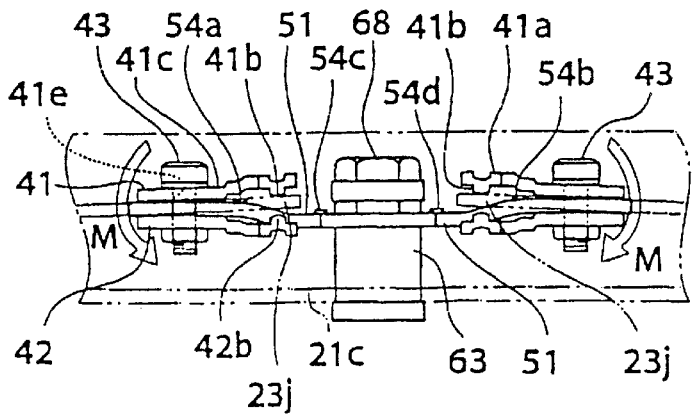

FIGS. 5(A)–5(C) are views showing the relation between the sensor plate and half arms. FIG. 5(A) is a plan view thereof, FIG. 5(B) is a side view thereof when no load is applied, and FIG. 5(C) is a side view thereof when a load is applied.

The seat weight measuring apparatus 9 comprises an elongate base 21 as a substrate. The base 21 extends lengthwise in the forward and backward direction when mounted to the vehicle body and is a product made by the press-working of a steel plate having a U-shaped cross section, as shown in FIGS. 2(C), 2(D). The bottom of the base 21 is referred as to a bottom plate 21c and portions which stand from the left and right edges of the bottom plate 21c to form corners of 90° there between are referred to as side plates 21a, 21a'.

Each of the base side plates 21a, 21a' is provided with two pairs of pin holes 21e and 21g in front and rear portions, respectively. The pin holes 21e, 21g are formed to face the pin holes 21e, 21g of the opposite side plates 21a, 21a'.

The holes 21e near the front and rear ends of the base 21 are formed in portions away at a distance from the front and rear ends, respectively, wherein the distance corresponds to approximately ⅛ of the overall length of the base 21. The holes 21e are vertically elongated holes, as shown in FIG. 2(B). Inserted through the elongated holes 21e are ends of bracket pins 27.

There are clearance between the bracket pin 27 and the elongated hole 21e all around the bracket pin 27 so that the bracket pin 27 is normally prevented from being in contact with the inner periphery of the elongated hole 21e. However, when excessive load is applied to the seat weight measuring apparatus 9 (concretely, to pin brackets 25), the bracket pins 27 are lowered to come in contact with lower portions of the inner peripheries of the elongated holes 21e whereby excess load is not transmitted to load sensors (the sensor plates 51, detailed later). That is, the pins 27 and the elongated holes 21e compose a part of a mechanism for defining the upper limit of load to be exerted on the sensor plates 51. The main function of each bracket pin 27 is transmitting the seat weight exerted on the pin bracket 25 to a Z arm 23.

The pin holes 21g are formed in positions closer to the center than the positions of the elongated holes 21e (at a distance corresponding to approximately 1/10 of the overall length of the base 21 from the elongated hole 21e). Inserted into the holes 21g are base pins 31. Each of the base pins 31 extends to bridge the left and right side plates 21a, 21a'. Fitted on the left and right ends of the pin 31 are retainers 33, thereby fixing the base pin 31 to the base 21. The base pin 31 is the pivot shaft of the Z arm 23.

The Z arms 23 are arranged inside of the base 21. Each of the Z arms 23 has a center portion, when seen in plan view, which is forked (into two branches 23h) and has a rectangular portion near the end. The Z arm 23 has side plates 23a, 23a' formed by upwardly folding left and right edge portions thereof by 90°. The side plates 23a,23a' extend from the end to the middle portion. The branches 23h are only flat plates. The side plates 23a,23a' extend along the inner surfaces of the side plates 21a,21a' of the base 21. There are clearances between the side plates 23a,23a' and the side plates 21a, 21a'.

Each of the Z arm side plates 23a, 23a' is provided with two pin holes 23c, 23e formed therein. Inserted into the pin holes 23c formed near the end is the bracket pin 27. The bracket pin 27 and the pin holes 23c slide little relative to each other. Inserted into the pin holes 23e at the center side is the base pin 31. The base pin 31 is the pivot of the Z arm 23, so the base pin 31 and the pin holes 23e slide relative to each other by pivotal movement of the Z arm 23. Sandwiched between the base side plates 21a and the Z arm side plates 23a about the base pin 31 are disk-like spacers 35 having holes.

The length of the branches 23h of the Z arm 23 corresponds substantially to a half of the overall length of the Z arm 23. The branches 23h are separated from each other to the right and left and extend toward the center of the base 21. Each of the branches 23h has a reduced width near the center. The action portions 23j at the ends of the branches 23h are clamped between wings 41a, 42a of upper and lower half arms 41, 42 as shown in FIGS. 3 and 5(A) through 5(C).

As a load is exerted on the pin bracket 25, the Z arm 23 slightly pivots (the maximum pivotal angle being approximately 5°) whereby the action portions 23j transmit the load to the sensor plate 51 through the half arms 41, 42.

The pin bracket 25 is formed to have an inverted U-shaped cross section as shown in FIG. 2(C). The length of the pin bracket 25 in the forward and backward direction substantially corresponds to 1/20 of that of the base 21. The pin bracket 25 has a flat upper surface 25a on which the seat rail 7 shown in FIGS. 6(A), 6(B) is mounted. The seat rail 7 is strongly fixed to the pin brackets 25 by bolts or other fastening means.

The pin bracket 25 has left and right side plates 25b downwardly projecting, of which lower ends are bent inwardly. The pin bracket 25 is disposed inside the Z arm 23 in such a manner as to have clearances between the side plates 25b and the Z arm side plates 23a, 23a'. The side plates 25b are provided with pin holes 25c formed therein. Inserted into the pin holes 25c is a bracket pin 27. The inner diameter of each pin hole 25c is larger than the diameter of the bracket pin 27. The clearance between them absorbs dimensional tolerance of the seat and the vehicle body and/or unexpected deformation.

Disposed between the side plates 25b of the pin bracket 25 and the side plates 23a, 23a' of the Z arm 23 is a spring plate 29 having spring washer portions with holes. The bracket pin 27 is loosely inserted into the holes of the spring washer portions. The spring plate 29 composes a centering mechanism for biasing the pin bracket 25 toward the center.

The centering mechanism as mentioned above causes the pin bracket 25 to be positioned as close to the center in the slidable range as possible. By the function of the centering mechanism, the movement of the slide mechanism and the pivotal mechanism after the installation of the seat weight measuring apparatus can be secured in the both directions (right and left, up and down, forward and backward).

Hereinafter, the structure around the sensor plate 51 will be described.

First, the structure of the sensor plate 51 itself will be described.

FIGS. 4(A) through 4(C) show a structural example of the sensor plate of the seat weight measuring apparatus according to the first embodiment of the present invention. FIG. 4(A) is a plan view of the sensor plate, FIG. 4(B) is a side sectional view of the sensor plate taken along the line X—X of FIG. 4(A), and FIG. 4(C) is a circuit diagram of the sensor.

Applied on the sensor plate (spring member) 51 as a base of the sensor 50 is an insulating layer (lower insulating layer) 52 for electrical insulation. Selectively formed on the insulating layer 52 is a wiring layer 53. Further selectively formed on the wiring layer 53 is a resistant layer 54 which composes the strain gauge. In addition, an insulating layer (upper insulating layer) 55 is applied over these layers as a protective layer. In this manner, the electrical circuit including resistors is directly laminated on the spring steel plate 51, thereby reducing the working cost and the assembly cost and further improving the heat resistance and the corrosion resistance.

The sensor plate 51 is a rectangular plate having two necks as a whole. The sensor plate 51 is provided with a central hole 51a formed in the center thereof and bolt holes 51b formed in end portions thereof. The sensor 50 is formed around the central hole 51a and between the central hole 51a and the bolt holes 51b. V-like concavities are provided in both side edges of regions 51c between the central hole 51a and the bolt holes 51b. These concavities ensure positions to be deformed of the sensor plate 51, thereby preventing positional variation of dislocation and stabilizing the sensitivity of the sensor 50.

The sensor 50 is substantially symmetrical about the center of the central hole 51a. The sensor 50 is composed of four strain gauges 54a, 54b, 54c, and 54d. Two of them 54a, 54b to be applied with tensile strain are arranged near the bolt holes 51b (near the ends), while the other two strain gauges 54c, 54d to be applied with compressive strain are arranged near the central hole 51a (central side). The strain gauges 54a, 54b, 54c, and 54d are connected to each other by wirings 53a, 53b, 53c, and 53d to form a bridge circuit shown in FIG. 4(C). Squares marked by numerals 1, 2, 3, 4 in FIGS. 4(A), 4(C) are terminals.

Arranged between the strain gauges 54a, 54c and the strain gauges 54b, 54d is a sensitivity control resistor 54e.

It should be noted that the load may be obtained by conversion from deflection of the sensor plate 51 detected by electrical capacitance pressure sensors or Hall elements, instead of the detection of dislocation of the sensor plate 51 being detected by the strain gauges 54a, 54b, 54c, and 54d.

Hereinafter, the structure around the sensor plate 51 will be described with reference to FIGS. 3 and 5(A)–5(C).

The sensor plate 51 is strongly fixed to the top of a column 63 at the center of the base bottom plate 21c by means of a washer 67 and a nut 68.

As shown in FIGS. 3 and 5(A)–5(C), the half arms 41, 42 are provided in the form of two pairs to be arranged above and below of the front and rear portions of the sensor plate 51 to clamp the sensor plate 51. Since the half arms 41, 42 have same configuration, a description will be made as to only an upper half arm 41.

The half arm 41 comprises a half arm body 41c which is a rectangular plate with an attachment hole 41e (FIGS. 5(B), 5(C)) formed in the center thereof. The half arm 41 further comprises wings 41a extending in the right and left directions from edges of the body 41c near the sensor plate center, and levee-like supports 41b formed on the backs of the wings 41a and extending in the right and left directions. The top of each support 41b is slightly edged.

Hereinafter, a description will be made as regard to the assembly structure of the upper and lower half arms 41, 42, the sensor plate 51, and the Z arm action portion 23j.

Since the lower surface of the body 41c of the upper half arm 41 and the upper surface of the body 42c of the lower half arm 42 are flat, these are fixed to the surfaces of the sensor plate 51 without backlash by means of screw 43. The wings 41a, 42a of the upper and lower half arms 41, 42 are arranged in such a manner that the supports 41b, 42b confront each other. Sandwiched between the supports 41b, 42b are the action portions 23j of the Z arm 23. The supports are positioned at the middle (the neck (the region 51c) of the sensor plate 51) of a region between the two strain gauges 54a and 54c or 54d and 54b.

As a load is exerted on the pin brackets 25 of the seat weight measuring apparatus 9, the Z arms 23 slightly pivot to raise the action portions 23j. FIG. 5(C) schematically and exaggeratedly shows the state of the sensor plate and the half arms.

As the action portions 23j of the Z arms are raised, the supports 41b of the upper half arms 41 are pushed up. Therefore, moments M are applied to the front or rear end portion of the sensor plate 51. By these moments M, the strain gauge 54a, 54b on the front and rear end portions are tensioned, while the strain gauges 54c, 54d near the center are compressed. The variations in the resistances of the respective strain gauges are obtained as electrical signals, thereby measuring the strain on the sensor plate and thus the load applied on the pin brackets 25.

Hereinafter, the entire structure of a dislocation/deflection absorbing mechanism for the seat weight measuring apparatus of this embodiment will be described.

Figure 1A:
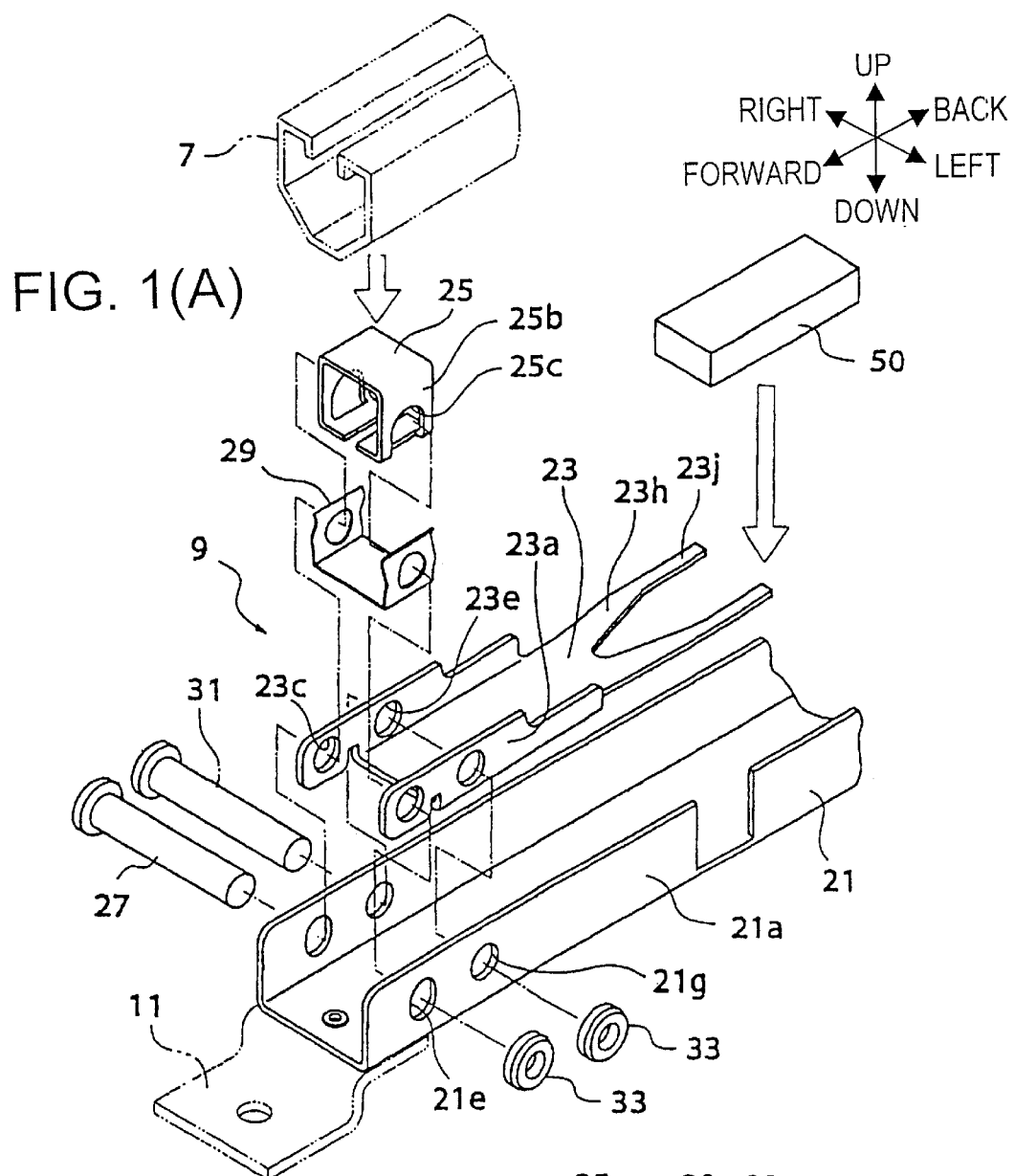
Figure 1B:
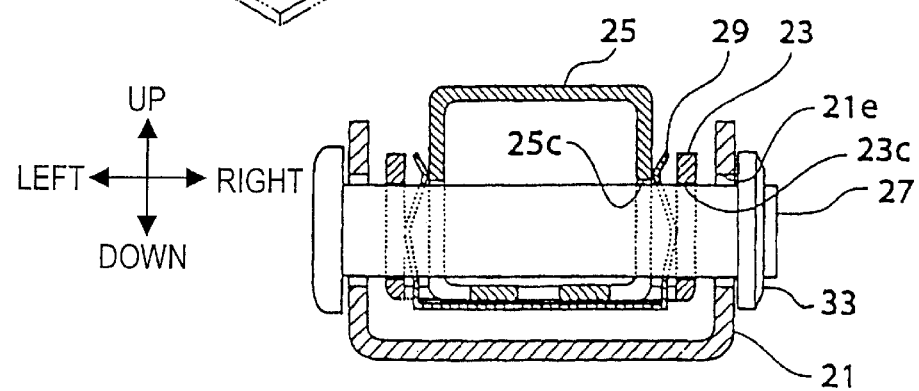

FIGS. 1(A), 1(B) are views showing the dislocation/deflection absorbing mechanism for the seat weight measuring apparatus of this embodiment. FIG. 1(A) is an exploded perspective view thereof and FIG. 1(B) is a front sectional view of a pin bracket. The pin bracket 25 is securely fixed to the seat rail 7 by a bolt or the like. The constructions of the respective components and their assembling relation of the seat weight measuring apparatus 9 have been described above with reference to FIG. 3.

In the vertical direction of the vehicle body, dislocation is absorbed by a space between the pin hole 25c of the pin bracket 25 and the bracket pin 27. The quantitative constructions thereof will be described later.

In the lengthwise direction of the vehicle body, dislocation is absorbed by forming the pin hole 25c of the pin bracket 25 into an elongated hole.

In the width direction of the vehicle body, dislocation is absorbed by spaces between the side plates 25b of the pin bracket 25 and the side plates 23a of the Z arm. It should be noted that this portion is provided with the centering mechanism by the spring plate 29.

As for the rotation about the axis in the vertical direction of the vehicle body, dislocation is absorbed mainly by spaces between the side plates 25b of the pin bracket 25 and the side plates 23a of the Z arm.

As for the rotation about the axis in the lengthwise direction of the vehicle body, dislocation is absorbed mainly by spaces between the side plates 25b of the pin bracket 25 and the side plates 23a of the Z arm, as well as the vertical direction of the vehicle body.

As for the rotation about the axis in the width direction of the vehicle body, dislocation is absorbed mainly by rotation of the pin bracket 25 about the bracket pin 27.

The quantitative constructions of the absorbing mechanism will now be described.

The absorbing mechanism of the seat weight measuring apparatus of this embodiment can slide the following $L_{UD}$ [mm] or more relative to the vertical direction of the vehicle body.

$$L_{UD} = \beta\{(H_1+H_2)/4\alpha + F\}$$

wherein $\beta$: deflection amount per unit load [mm/kgf] of the absorbing mechanism in the vertical direction, $H_1$: dimensional error [mm] of the legs of the seat in the vertical direction, $H_2$: dimensional error [mm] of the seat fixing portions of the vehicle body in the vertical direction, $\alpha$: deflection amount per unit load [mm/kgf] when three of four legs of the seat are fixed and the residual one is deformed in the vertical direction, and F: the lower limit [kgf] of the weight measurable range of one leg of the seat.

Figure 7A:
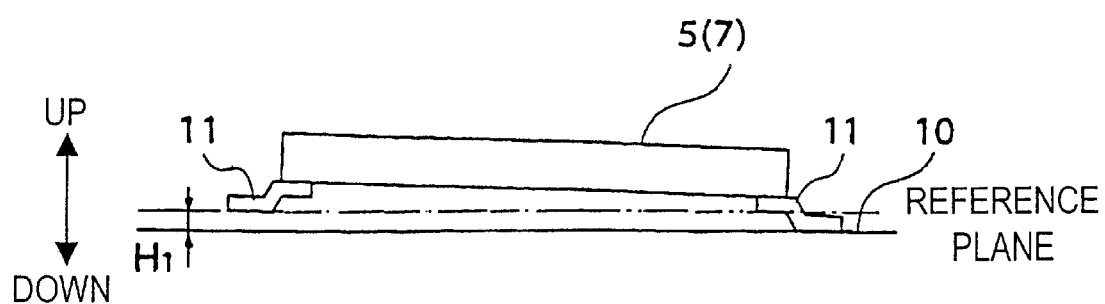
FIGS. 7(A) and 7(B) are views for explaining the way of examining the slidable dimension of the absorbing mechanism relative to the vertical direction of the vehicle body.
Figure 7B:
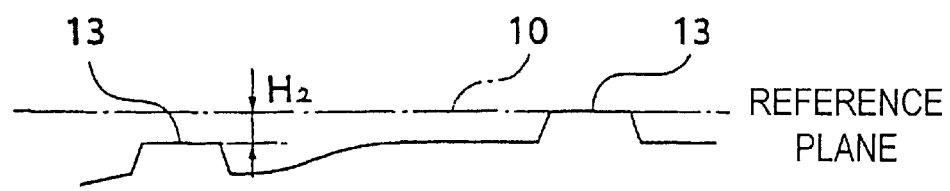

FIGS. 7(A), 7(B) are views for explaining the way of examining the slidable dimension of the absorbing mechanism relative to the vertical direction of the vehicle body.

FIG. 7(A) shows the dimensional error of the seat. When the leg portion of the seat is put on a flat surface 10, one of the legs (brackets 11) is away from the flat surface 10 by an error $H_1$. The seat means a unit comprising a seat frame (designated by a numeral 5 in FIG. 6) and a seat rail (designated by a numeral 7 in FIG. 6).

FIG. 7(B) shows the dimensional error of the seat mounting portions 13 of the vehicle body. There is an error $H_2$ on one of the seat mounting portions 13 when a flat surface 10 formed by the other three seat mounting portions 13 is assumed as a reference surface.

In the state shown in FIGS. 7(A) and 7(B), the leg 11 having the error $H_1$ is forced to be pressed to the seat mounting portion 13 having the error $H_2$ for assembly. Force $F_A$ (assembly load) exerted on the leg 11 due to the deformation is given by the following expression, assuming the worst case that the other three legs are not deformed:

$$F_A = (H_1+H_2)/\alpha \tag{1}$$

In case where the four mounting portions have the respective absorbing mechanisms, the absorption of deformation can be shared by the four mounting portions so that the force $F_A$ exerted on the leg is given by the following expression:

$$F_A = (H_1+H_2)/4\alpha \tag{1}$$

On the other hand, the slidable dimension $L_{UD}$ in the vertical direction to be absorbed by the absorbing mechanism is given by the following expression:

$$L_{UD} = \beta(F_A+F) \tag{2}$$

This expression means that the load sensor mechanism may deform a value obtained by multiplying the sum of $F_A$ (assembly load) and F by a deformation amount β per unit load in the vertical direction of the load sensor mechanism wherein F is the sum of $F_S$ (the seat itself) and $F_M$ (a person or an object on the seat) and the sum of $F_A$ and F is the total weight to be applied to the seat weight measuring apparatus. The absorbing mechanism should absorb the deforming value.

The following expression is given according to the above expressions (1') and (2):

$$L_{UD}=\beta\{(H_1+H_2)/4\alpha+F\} \quad (3)$$

Followings are values according to one example of design specification:

dimensional tolerance $(H_1+H_2)=\pm 5$ mm
$4\alpha=0.25$ mm/kgf
F=60 kgf
β=0.02 mm/kgf
$L_{UD}=0.02\times 80$ kgf=1.6 mm Description will now be made with regard to the absorbency of the absorbing mechanism in the width direction of the vehicle body.

When a load is applied to the seat after the seat weight measuring apparatus is installed to the vehicle body, loads are applied due to the deformation of the seat and the deformation of the vehicle body while the vehicle runs. These loads are absorbed by the connecting portion not to transmit the loads to the load sensors. The range of the absorbable deformation is given by the following expression.

The absorbing mechanism of this embodiment can slide the following $L_{LR}$ or more relative to the width direction of the vehicle body.

$$L_{LR}=ax+by+c-L_S$$

wherein
x: distance [mm] from the center of the seat in the width direction to the center of the seat leg,
a: rate of change of the aforementioned x per unit load (within the measurable range), $a=\Delta x/x$,
b: sinusoidal quantity (sin θ) per unit load (within the measurable range) of a deflection angle θ in the horizontal direction between the center of the bottom of seat leg and the center of the seat leg,
y: the height of the seat leg,
c: dimensional tolerance [mm] from the center of the seat and the center of the seat leg, and
$L_S$: deflection amount [mm] allowed by the load sensors.

Figure 8A:
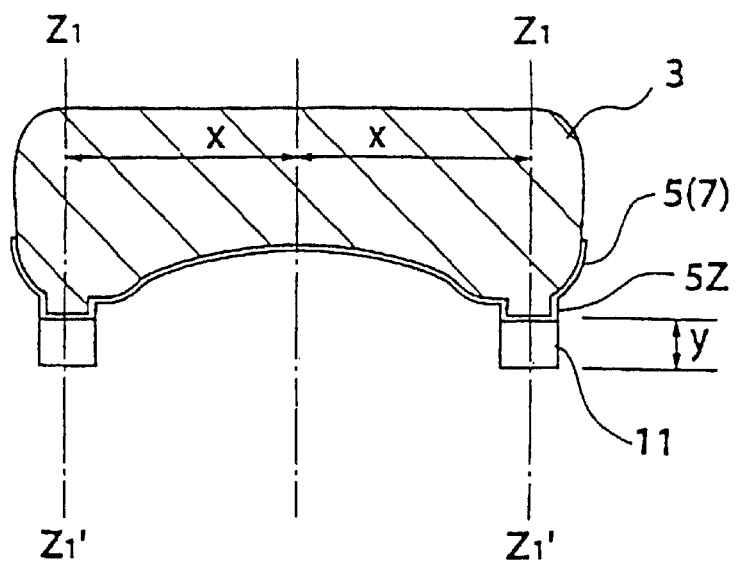
Figure 8B:
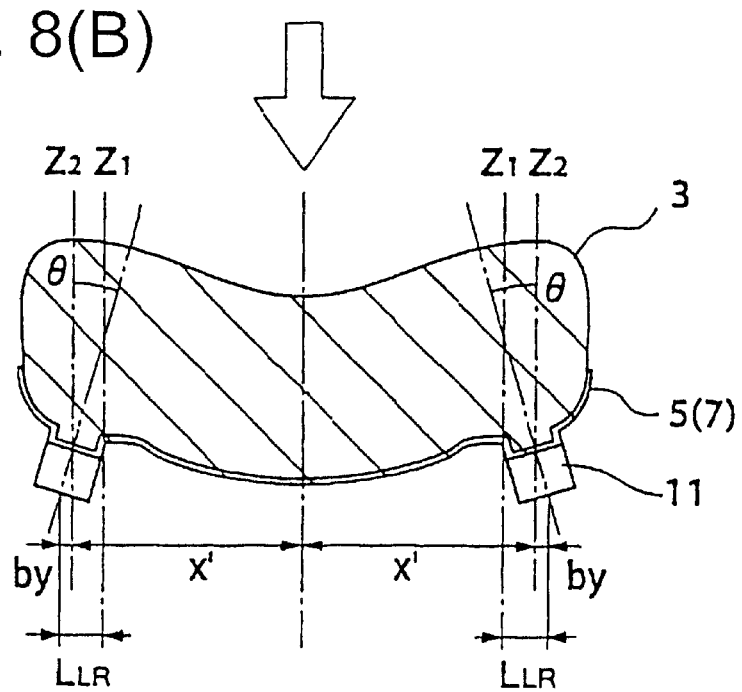

FIGS. 8(A), 8(B) are views for explaining the way of examining the slidable dimension of the absorbing mechanism relative to the width direction of the vehicle body. FIG. 8(A) shows a state before a load is applied and FIG. 8(B) shows a state after the load is applied.

FIGS. 8(A), 8(B) show the seat 3, the seat frame 5, and the seat brackets 11. It should be noted that the seat frame 5 shown in the drawings includes the seat rails 7.

In FIG. 8(A), "x" is a distance from the center of the seat in the width direction to the center $Z_1$, $Z_1'$ of the right or left seat leg. The height of each seat bracket 11 is "y".

In FIG. 8(B), when the load is applied to the seat 3, "x" is changed to "x'" and the vertical center line of the seat rail 11 is inclined by θ. Therefore, deflection between the center of the seat leg and the center of the seat bracket is the sum of "x'−x=Δx" and "y sin θ".

Here, expressions "Δx=ax" and "y sin θ=by" are established.

The absorbing mechanism should further absorb the original dimensional tolerance c. The slidable dimension $L_{LR}$ of the absorbing mechanism in the width direction is given by the following expression in which the deflection amount $L_S$ is subtracted from the sum of the deflection between the center of the seat leg and the center of the seat bracket and the dimensional tolerance.

$$L_{LR}=ax+by+c-L_S$$

The following are values according to one example of a design specification when x=250 mm and y=20 mm:

a=0.002–0.005
b=0.01–0.07
c=0.1–1 mm
$L_S$=1.3–2.5 mm
$L_{LR}$=1.3–2.0 mm

Because of the clearance between the pin hole 25c of the pin bracket 25 and bracket pin 27, the absorbing mechanism of this embodiment can rotate by $\theta_{LR}$ or more about an axis extending in a widthwise direction of the vehicle body:

$$\theta_{LR}=\tan^{-1}(H/W)$$

wherein
H: a difference in height between the front leg and the rear leg of the seat (connecting points) and
W: a space between the front leg and the rear leg of the seat (connecting points).

The clearance between pin hole 25c of the pin bracket 25 and bracket pin 27 allows the absorbing mechanism to rotate about an axis extending in a vertical direction of the vehicle body. The degree of pivoting allowed is more than a difference from parallel of the seat rails.

Figure 9A:
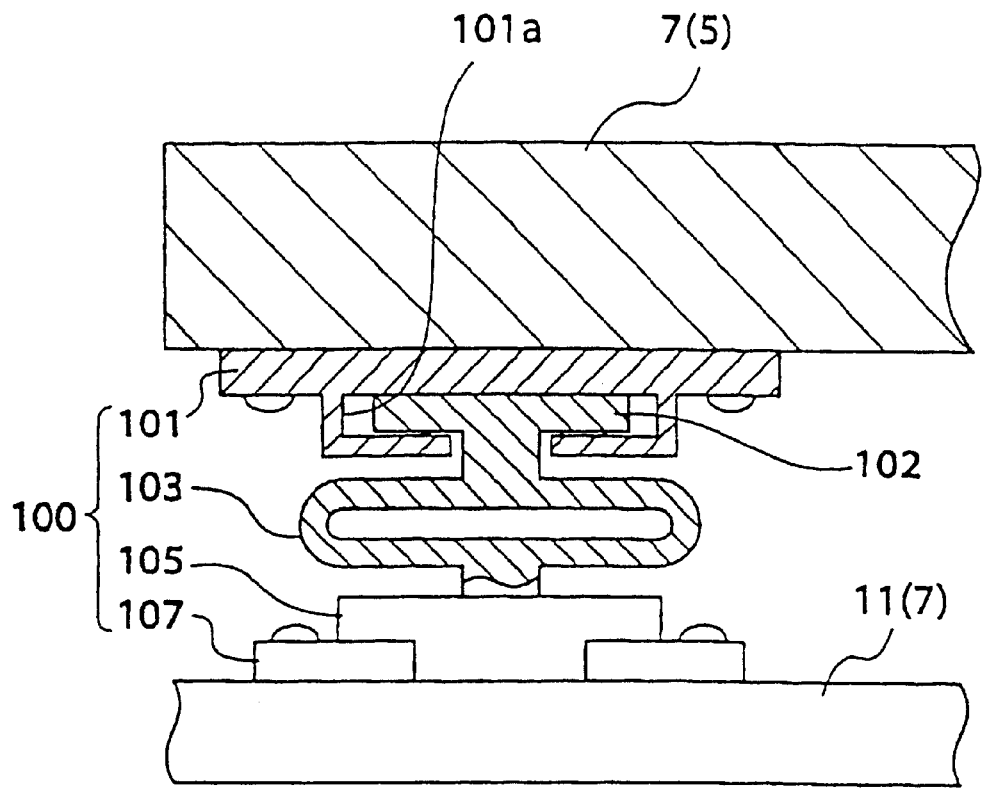
FIG. 9(A) is a side sectional view showing the construction of a seat weight measuring apparatus according to a second embodiment of the present invention.
Figure 9B:
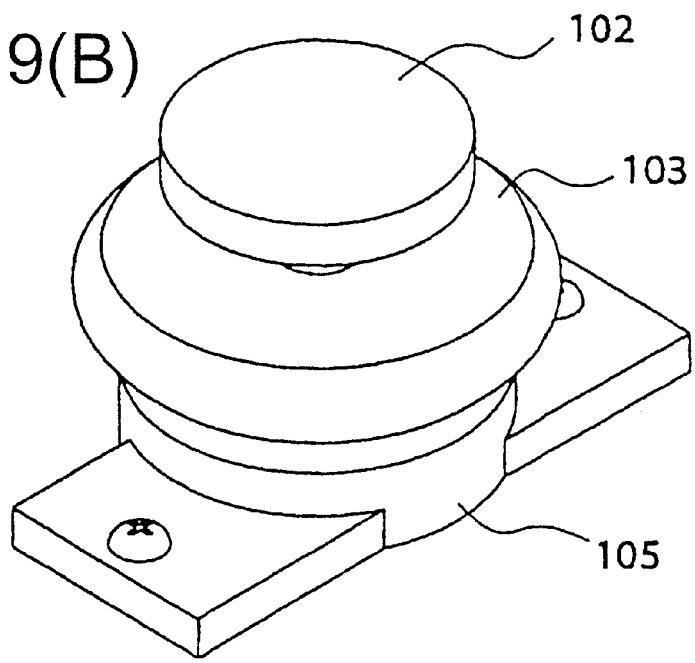
FIG. 9(B) is a perspective view showing the detailed structure of a load cell, hollow suspension, and XY slider according to the second embodiment.

FIG. 9(A) is a side sectional view showing the construction of a seat weight measuring apparatus according to a second embodiment of the present invention. FIG. 9(B) is a perspective view showing the detailed structure of a load cell, hollow suspension, and XY slider according to the second embodiment.

A seat weight measuring apparatus 100 is arranged between the seat rail 7 and the seat mounting portion 11 of the vehicle body or between the seat frame 5 and the seat rail 7.

The seat weight measuring apparatus 100 comprises load cells 105, hollow suspensions 103, and XY sliders 102.

Each load cell 105 includes a strain gauge therein to measure the seat weight. Each load cell 105 is fixed to the seat mounting portion 11 by a fixing plate 107.

Each hollow suspension 103 is a member transmitting a load to each load cell 105. Each hollow suspension 103 is a hollow member having a relatively small thickness. Therefore, the hollow suspension 103 can elastically deform in the vertical, lengthwise, and width directions.

Each XY slider 102 is a disk-like member and is engaged with a disk-like concavity 101a of a base 101 with a space therebetween. The XY slider 102 can slide in the lengthwise and width directions (XY directions) within the concavity 101a.

The hollow suspensions 103 and the XY sliders 102 compose an absorbing mechanism of this seat weight measuring apparatus 100.

Hereinafter, the actions of the structure around the sensor plate of the seat weight measuring apparatus according to the first embodiment of the present invention will be described with reference to FIG. 10(A) through FIG. 12.

Figure 10A:
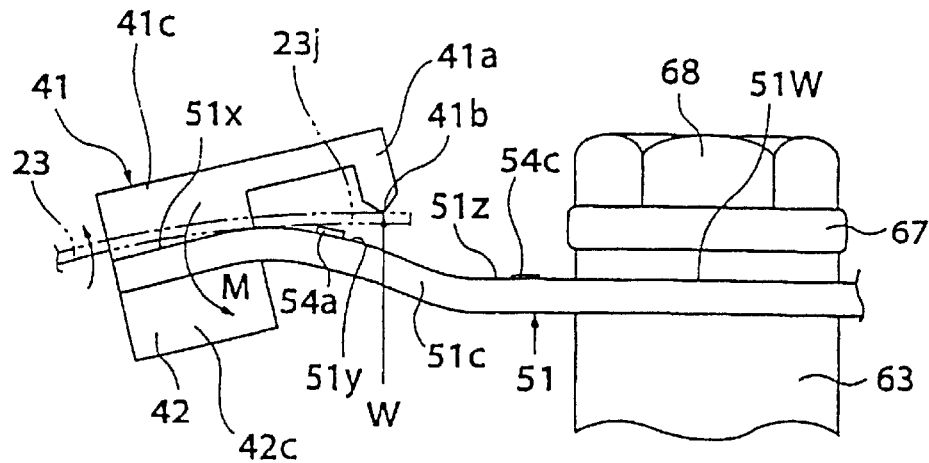
FIGS. 10(A) through 10(C) are views for explaining the actions of the structure around a sensor plate of a seat weight measuring apparatus according to the first embodiment of the present invention.
Figure 10B:
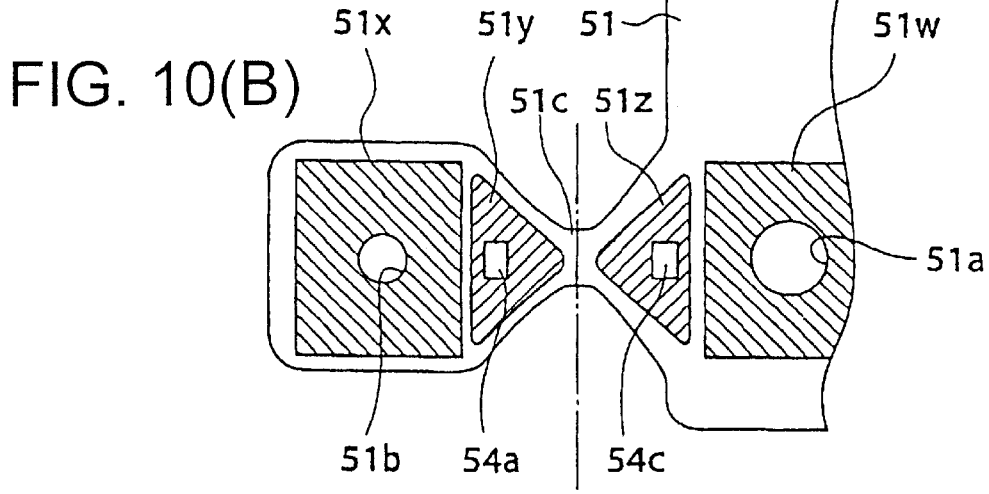
Figure 10C:
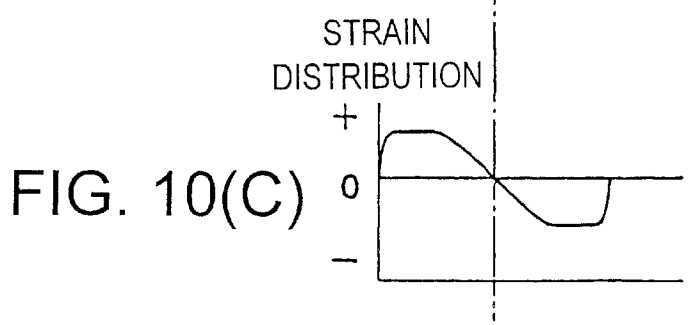

FIGS. 10(A) through 10(C) are views for explaining the actions of the structure around the sensor plate of the seat weight measuring apparatus according to the first embodiment of the present invention. FIG. 10(A) is a side view thereof, FIG. 10(B) is a plan view of the sensor plate, and FIG. 10(C) is a graph schematically illustrating strain distribution on the surface of the sensor plate. It should be noted that these figures show only the front half and the central portion of the sensor plate.

Figure 11:
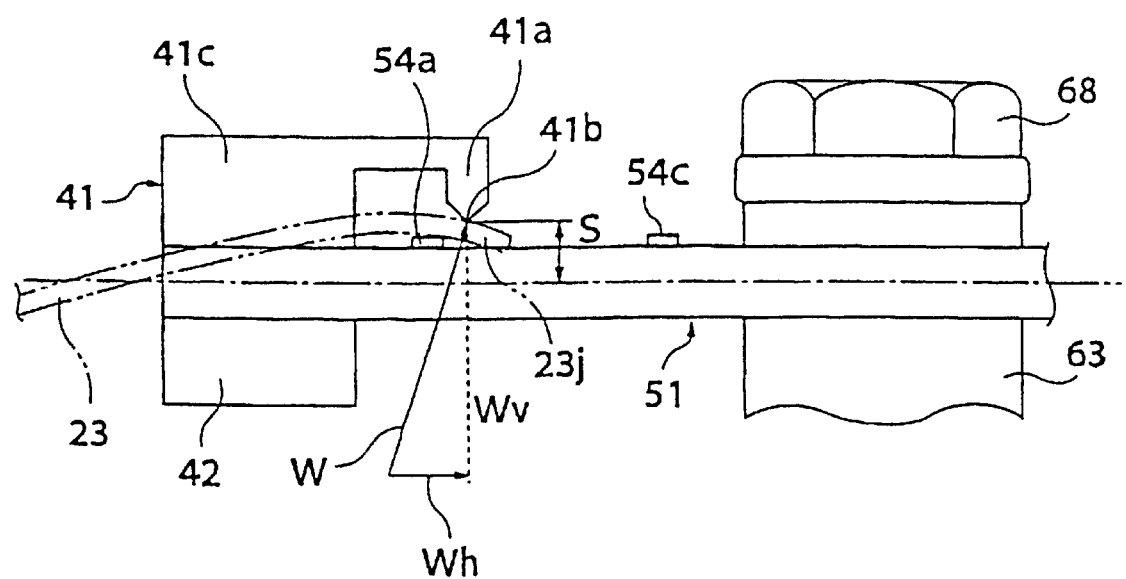
FIG. 11 is a side view for explaining the action when axial force (force in the longitudinal direction) is applied to supports of half arms according to the first embodiment of the present invention.

FIG. 11 is a side view for explaining the action when axial force (force in the longitudinal direction) is applied to the supports of the half arms.

FIG. 12 is a graph showing data indicating the influences of the axial force applied to the supports of the half arms on the measurement data.

As shown in FIG. 10(A), the Z arm 23 slightly pivots upwardly (see FIG. 2(B)) according to the seat weight to raise up the supports 41b of the wings 41a of the half arm 41. According to the force W raising up the supports 41b, moment M is transmitted from the half arm body 41c to the sensor plate 51. By the moment M, the sensor plate 51 is deformed in wave-like profile so as to create a region 51y of which strain is tensile (+) and a region 51z of which strain is compressional (-).

Since the bodies 41c and 42c of the half arms 41 and 42 clamping the ends of the sensor plate 51 are thick and have high rigidity as described above, a load applied portion 51x of the sensor plate 51 clamped by the bodies 41c and 42c is little deformed. In addition, the central portion (fixed portion 51w) of the sensor plate 51 is also little deformed because the portion 51w is vertically clamped by a washer 67 and a column 63 which both have high rigidity.

On the other hand, a portion between the load applied portion 51x and the central fixed portion 51w has such a plane configuration that two triangular portions are disposed to oppose to each other about the neck 51c as shown in FIG. 1(B). Formed on this portion are the tension-side constant surface strain region 51y and the compression-side constant surface strain region 51z. Attached to the regions 51y and 51z are a tension-side strain gauge 54a and a compression-side strain gauge 54c, respectively.

Therefore, the tension-side strain gauge and the compression-side strain gauge are wired on the bridge circuit in such a manner as to form an opposite phase, thereby increasing the outputs of the strain gauges. This attains high precise measurement with small strains on the sensor, thereby increasing the life of the sensor.

Since the surfaces on which the strain gauges are attached are on one side of the sensor plate 51, printing process should be made only on one side when the strain gauges and wirings are printed by, for example, screen printing. This allows sensors to be manufactured at lower cost.

The strain gauges are attached (printed) on regions providing constant surface strain, so strain may not vary even through the positions of strain gauges are slightly shifted, thereby preventing measurement error. Therefore, this can ensure high precision of measurement and can reduce quality requirement on manufacturing.

Because strains are concentrated in portions on which the strain gauges are attached, highly precise measurement is performed and measurement error can be prevented even with manufacturing error and/or assembling error of other parts.

Hereinafter, axial force applied from the Z arm 23 to the half arm 41 will be described with reference to FIG. 2. As described above, force W is applied from the action portions 23j of the Z arm 23 to the supports 41b of the wings 41a of the half arm 41. The force W is mainly composed of vertical component $W_v$ because of the structure of the half arm 23. However, the force W may partially composed of horizontal component (axial force) $W_h$. Due to elongation or dislocation of the Z arm 23, frictional force may act on the supports 41b in the lateral direction.

Force due to the friction and deformation can be released not to apply axial force to the half arm 41 because the action portions 23j of the Z arm 23 and the supports 41b are not restrained in the axial direction (the longitudinal direction) so that they are allowed to slip relative to each other.

When the axial force $W_h$ is applied, axial stress acting on the sensor plate 51 can be cancelled by offsetting the outputs of the tension-side strain gauge 54a and the compression-side strain gauge 54c.

This state is shown in FIG. 12. In the graph of FIG. 12, the abscissa indicates the load (kgf) applied on the seat and the ordinate indicates the output (mV) of the strain gauges.

Hysteresis in the outputs of the compression-side strain gauge and the tension-side strain gauge is clearly shown in this graph, the hysteresis being developed by rise and fall in load. This is because axial force is produced between the Z arms and the half arms during rise or fall in load. However, in the total output obtained by subtracting the output of the compression-side strain gauge from the output of the tension-side strain gauge, nearly non hysteresis is shown so that the data of the total output is almost linear. This is because the axial force is cancelled as described in the above.

When load is applied in the longitudinal direction and/or rotational moment is applied, the balance of strain between the tension side and the compression side is changed in such a manner as not to change the total sensitivity of the sensors relative to the vertical load. That is, even with dislocation in a horizontal direction (e.g. the longitudinal direction of the vehicle) or axial force acting on the sensor plate, error can be cancelled by means of the compression-side strain gauge and the tension-side strain gauge and the total sensitivity obtained by summing the outputs of both the strain gauges may not include such error.

As shown in FIG. 11, with the axial force $W_h$, a space S between the center line of the sensor plate 51 and the supports 41b of the half arm 41 acts as a moment arm so as to apply $W_h \times S$ moment on the sensor plate 51, creating an error factor. In the seat weight measuring apparatus of the present invention, therefore, the load applied points 41b of the half arm 41 and the center line in the thickness of the sensor plate 51 are set to be in substantially the same level or have height difference of ±5 mm or less. According to this structure, when frictional force (axial force $W_h$) acts on the action points 41b, the moment arm for deforming the sensor plate due to the frictional force is short. This means that the deformation of the sensor plate due to the frictional force is little, thereby reducing the measurement error.

As can be seen from the foregoing description, the present invention can provide a seat weight measuring apparatus in which the performance of load sensors is not spoiled due to dimensional error or deformation of a vehicle body or a seat. Further, the present invention can provide a seat weight measuring apparatus which has good durability and high precision but can be manufactured at low cost. Further still, the present invention can provide a seat weight measuring apparatus with reduced measurement error due to manufacturing error of parts of a mechanism and/or frictional force.

The priority documents here Japanese Application No. H11-061340, filed Mar. 9, 1999, and Japanese Application No. H11-061341, filed Mar. 9, 1999 (including their specifications, drawings, and claims), are hereby incorporated by reference into this application.

What is claimed is:

1. A seat weight measuring apparatus for measuring a seat weight including the weight of a passenger sitting thereon, comprising:
   load sensors arranged inside a seat or between the seat and a vehicle body for converting at least parts of the seat weight into electric signals, and
   an absorbing mechanism for absorbing an assembly load so that the assembly load is not measured by the load sensors.

2. A seat weight measuring apparatus as claimed in claim 1, wherein said absorbing mechanism is configured to operate after said seat weight measuring apparatus is installed to the vehicle body.

3. A seat weight measuring apparatus as claimed in claim 1, wherein said absorbing mechanism includes a slide mechanism and a pivotal mechanism.

4. A seat weight measuring apparatus as claimed in claim 1, further comprising a centering mechanism for regulating the position of said absorbing mechanism.

5. A seat weight measuring apparatus as claimed in claim 1, wherein said absorbing mechanism can slide the following $L_{UD}$ [mm] or more relative to a vertical direction of the vehicle body:

$$L_{UD}=\beta\{(H_1+H_2)/4\alpha+F\}$$

wherein
   $\beta$: deflection amount per unit load [mm/kgf] of the absorbing mechanism in the vertical direction,
   $H_1$: dimensional error [mm] of legs of the seat in the vertical direction,
   $H_2$: dimensional error [mm] of seat fixing portions of the vehicle body in the vertical direction,
   $\alpha$: deflection amount per unit load [mm/kgf] when three of four legs of the seat are fixed and a residual one is deformed in the vertical direction, and
   $F$: a lower limit [kgf] of a weight measurable range of one leg of the seat.

6. A seat weight measuring apparatus as claimed in claim 1, wherein said absorbing mechanism is configured to slide in the lengthwise direction of the vehicle body a distance that is greater than a lengthwise dimensional tolerance of brackets for mounting seat rails.

7. A seat weight measuring apparatus as claimed in claim 1, wherein said absorbing mechanism can slide the following $L_{LR}$ or more relative to a widthwise direction of the vehicle body:

$$L_{LR}=ax+by+c-L_S$$

wherein
   x: a distance [mm] from a center of the seat in the widthwise direction to a center of a seat leg,
   a: a rate of change of the aforementioned x per unit load, $a=\Delta x/x$,
   b: sinusoidal quantity (sin θ) per unit load of a deflection angle θ in a horizontal direction between a center of a bottom of the seat leg and the center of the seat leg,
   y: a height [mm] of a seat leg,
   c: dimensional tolerance [mm] from the center of the seat and the center of the seat leg, and
   $L_S$: deflection amount [mm] allowed by the load sensors.

8. A seat weight measuring apparatus as claimed in claim 1, wherein said absorbing mechanism can pivot by $\theta_{LR}$ or more about an axis extending in a widthwise direction of the vehicle body:

$$\theta_{LR}=\tan^{-1}(H/W)$$

wherein
   H: a difference in height between a front leg and a rear leg of the seat (connecting points) and
   W: a space between the front leg and the rear leg of the seat (connecting points).

9. A seat weight measuring apparatus as claimed in claim 1, wherein said absorbing mechanism can pivot about an axis extending in a vertical direction of the vehicle body an amount more than an amount required to accommodate non-parallel positioning of seat rails connected to the seat.

10. A seat weight measuring apparatus as claimed claim 1, wherein said absorbing mechanism includes a plurality of transmitting members for transmitting the weight of the seat to the load sensors, each of said transmitting members being rotatably journalled by a pivot pin.

11. A seat weight measuring apparatus as claimed in claim 10, wherein each of said transmitting members is provided with a hole into which said pivot pin is loosely inserted.

12. A seat weight measuring apparatus as claimed in claim 10, wherein each of said transmitting members can slide in the axial direction of said pivot pin.

13. A seat weight measuring apparatus as claimed in claim 1, further comprising a restricting mechanism for restricting a load applied to said load sensors.

14. A seat weight measuring apparatus for measuring a seat weight including the weight of a passenger sitting thereon, comprising load sensors arranged inside a vehicle seat or between the seat and a vehicle body for receiving load relating to the seat weight and for converting the load into electric signals, wherein
   each of said load sensors has a sensor member having a constant thickness and a width that varies over a length of the member and which is deformable when subjected to the applied load, and a plurality of strain gauges attached to a strain measuring surface of said sensor member,
   the strength in deformation of an elastic deforming portion of the sensor member is adjusted so as to form a region providing substantially constant surface strain on a portion of the strain measuring surface of the sensor member when the sensor member is subjected to the applied load, and
   said strain gauges are attached to said region.

15. A seat weight measuring apparatus as claimed in claim 14, wherein tension-side and compression-side constant surface strain regions are formed and said strain gauges are attached to the constant surface strain regions, respectively.

16. A seat weight measuring apparatus for measuring a seat weight including the weight of a passenger sitting thereon, comprising load sensors arranged inside a vehicle seat or between the seat and a vehicle body for receiving load relating to the seat weight and converting the load into electric signals, wherein
   each of said load sensors has a sensor member having a constant thickness and a width that varies over a length of the member and which is deformable when subjected to the applied load, and a plurality of strain gauges attached to a strain measuring surface of said sensor member,
   said sensor member is a cantilever,
   one end is a fixed portion, the other end is a subjected portion to be subjected to the applied load, and a portion between the ends is a strain gauge fixing portion, and both the fixed portion and the subjected portion are patched with reinforcing members to concentrate strain in the strain gauge fixing portion.

17. A seat weight measuring apparatus as claimed in claim 16, wherein:

the subjected portion of said sensor member is provided with a half arm, said half arm has a body having relatively high rigidity to be in contact with the subjected portion and wings projecting from the body, said wings have action portions to be subjected to simple load (normal load not moment), said half arm has such a structure (reversing structure) that the simple load is transmitted mainly as bending moment to the subjected portion of said sensor member via the body of said half arm, and according to the reversing structure of said half arm, a wave-like strain is applied to the strain measuring surface of said sensor member.

18. A seat weight measuring apparatus as claimed in claim 17, wherein said half arm is provided with a releasing mechanism at the action portions thereof, wherein the releasing mechanism releases load besides vertical load by sliding or rotation, and the strain gauge fixing portion of said sensor member has a compression-side region and a tension-side region which are arranged symmetrically about a neck portion with a reduced width in its plane view.

19. A seat weight measuring apparatus as claimed in claim 17, wherein each of the action portions of said half arm an include an action point in contact with the sensor member, and wherein the action point and a center line in the thickness of said sensor member are set to be in a substantially same level.

20. A seat weight measuring apparatus as claimed in claim 17, wherein each of the action portions of said half arm include an action point in contact with the sensor member, and wherein the action point and a center line in the thickness of said sensor member are set to have a height difference of ±5 mm or less.

* * * * *